United States Patent
Lehto et al.

(10) Patent No.: US 7,794,182 B2
(45) Date of Patent: Sep. 14, 2010

(54) MILLING INSERT AND A MILLING TOOL, AS WELL AS A SHIM PLATE FOR SUCH TOOLS

(75) Inventors: Ralf Lehto, Gävle (SE); Lars-Gunnar Wallström, Sandviken (SE); Göran Pantzar, Sandviken (SE); Per Blomstedt, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 164 days.

(21) Appl. No.: 12/007,943

(22) Filed: Jan. 17, 2008

(65) Prior Publication Data
US 2008/0118314 A1    May 22, 2008

Related U.S. Application Data

(63) Continuation of application No. 11/439,433, filed on May 24, 2006, now Pat. No. 7,419,336.

(30) Foreign Application Priority Data

Jun. 1, 2005    (SE) .................... 0501247

(51) Int. Cl.
*B23C 5/20* (2006.01)
(52) U.S. Cl. .............. 407/35; 407/42; 407/54; 407/40; 407/113
(58) Field of Classification Search ............ 407/35, 407/40, 42, 43, 47, 48, 51, 55, 57, 60–62, 407/64, 66, 101–104, 113; *B23C 5/20*
See application file for complete search history.

(56) References Cited

U.S. PATENT DOCUMENTS

| | | | |
|---|---|---|---|
| 4,050,127 A * | 9/1977 | Bodem et al. ............. | 407/107 |
| 4,525,110 A * | 6/1985 | Stojanovski ............... | 407/40 |
| 4,898,499 A * | 2/1990 | Tsujimura et al. .......... | 407/42 |
| 4,927,303 A | 5/1990 | Tsujimura et al. | |
| 4,979,849 A * | 12/1990 | Kezran ..................... | 407/107 |
| 5,017,055 A | 5/1991 | Tsujimura et al. | |
| 5,222,841 A * | 6/1993 | Simkhovich ............... | 407/5 |

(Continued)

FOREIGN PATENT DOCUMENTS

JP    55037221 A * 3/1980

(Continued)

OTHER PUBLICATIONS

English translation of JP 11090723 A, Matamuso, Apr. 1999.*

*Primary Examiner*—Boyer D Ashley
*Assistant Examiner*—Sara Addisu
(74) *Attorney, Agent, or Firm*—Drinker Biddle & Reath LLP

(57) ABSTRACT

An indexable milling insert includes opposite top and bottom sides between which a peripheral clearance surface extends, and two opposite cutting edges formed in the transition between the top side and the clearance surface. Each of the cutting edges includes a substantially straight portion connected with a straight section of the clearance surface, and further includes a curved portion connected with a convexly arched section of the clearance surface. A coupling including one or more male- and/or female-like engagement members is located along said clearance surface. Furthermore, the milling insert may be used with a shim plate for attachment to a milling tool.

16 Claims, 5 Drawing Sheets

U.S. PATENT DOCUMENTS

| | | | |
|---|---|---|---|
| 5,294,219 A | * | 3/1994 | Shiratori et al. ............... 407/34 |
| 5,443,334 A | * | 8/1995 | Pantzar ....................... 407/113 |
| 5,685,670 A | * | 11/1997 | Satran ......................... 407/42 |
| 5,924,826 A | | 7/1999 | Bystrom et al. |
| 5,951,213 A | | 9/1999 | Fauser et al. |
| 6,048,140 A | | 4/2000 | Johnson |
| 6,086,290 A | | 7/2000 | Qvarth et al. |
| 6,102,630 A | | 8/2000 | Flolo |
| 6,135,677 A | | 10/2000 | Fijimoto et al. |
| 6,149,355 A | | 11/2000 | Fouquer et al. |
| 6,536,996 B2 | | 3/2003 | Satran et al. |
| 6,607,334 B2 | * | 8/2003 | Satran et al. .................. 407/35 |
| 6,715,968 B1 | | 4/2004 | Tagstrom et al. |
| 7,419,336 B2 | * | 9/2008 | Lehto et al. ................... 407/35 |
| 2002/0037199 A1 | * | 3/2002 | Satran et al. .................. 407/54 |

FOREIGN PATENT DOCUMENTS

| | | |
|---|---|---|
| JP | 11090723 A  *  4/1999 | |
| WO | WO 2004/082877 | 9/2004 |

* cited by examiner

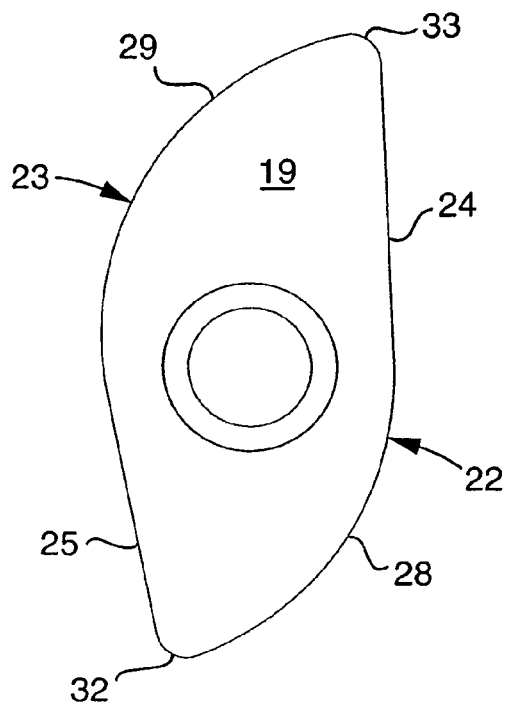
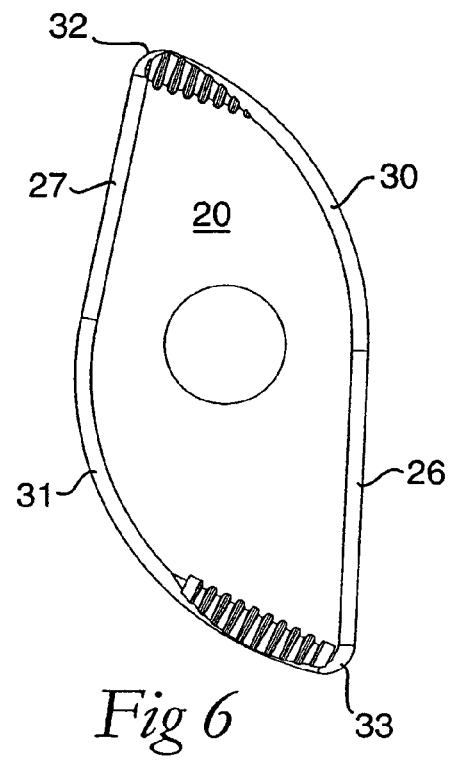
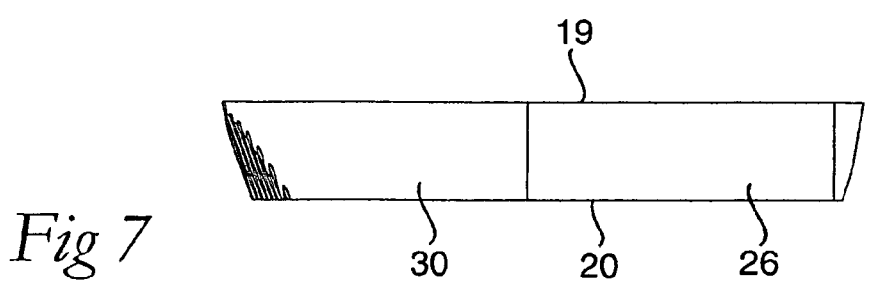
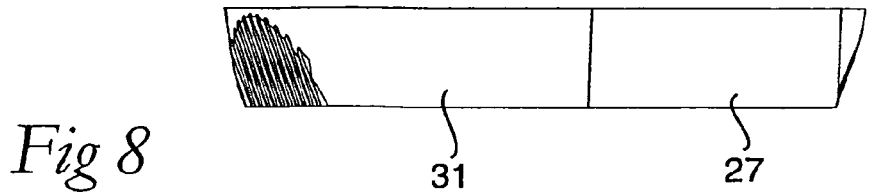

MILLING INSERT AND A MILLING TOOL, AS WELL AS A SHIM PLATE FOR SUCH TOOLS

This is a continuation application of copending application Ser. No. 11/439,433, filed on May 24, 2006 now U.S. Pat. No. 7,419,336, which is incorporated herein by reference in the entirety.

This application claims priority under 35 U.S.C. §119 to Swedish Patent Application No. 0501247-1, filed on Jun. 1, 2005, the disclosure of which is incorporated by reference herein in its entirety.

FIELD OF THE INVENTION

Within the field of machining, particularly cutting, an interface may be used between different cutting tool components that includes a coupling formed with cooperating male- and female-like engagement members. Particularly, such couplings may be used in the interface between the basic body of the tool and replaceable milling insert(s).

BACKGROUND OF THE INVENTION

A known tool for contour milling includes a conventional, indexable milling insert for a contour or end mill. Such a conventional milling insert includes two cutting edges, each one of which has a curved portion connected with a substantially straight portion. The milling insert has, overall, an oval shape as viewed in a planar view. The bottom and side-support surfaces of the milling insert are planar and securing the milling insert is guaranteed principally by the tightening force from a tightening screw, as well as the cooperation between the clearance surfaces of the milling insert and the side-support surfaces of the insert seat. Such known tools, especially those for machining at small cutting depths when only the curved portion of the cutting edge is in engagement with a workpiece, are subject to great axial force components, which tend to press the milling insert out of the insert seat. In turn, this results in the tightening screw being subjected to great forces and there is a risk that the securement may become unstable. At great cutting depths, when the straight portion is also in engagement with the workpiece, this problem does not arise to the same extent, since there is a counteracting force from the part of the workpiece that is machined by the straight portion.

Another known milling tool and milling insert purportedly solve the problem of unstable securements by arranging a recess on the bottom side of the milling insert. The recess cooperates with a projection from the bottom surface of the insert seat. In the mounted state, contact is established on one hand between the bottom side of the milling insert and the bottom surface of the insert seat, and on the other hand between parts of the clearance surface of the milling insert and a plurality of side-support surfaces of the insert seat, as well as between the recess of the milling insert and the projection of the insert seat. However, this solution suffers from the drawback that the abutment becomes overdetermined, i.e., the precise positioning of the cutting edges in relation to the basic body is lost, and the milling insert, in the worst case, wobbles in the insert seat.

Yet another known milling tool and milling insert purportedly solve the problem of unstable securements and inexact positioning by arranging a plurality of recesses on the bottom side of the milling insert. These recesses cooperate with a plurality of projections from the bottom surface of the insert seat. Upon mounting, the milling insert is inserted into the insert seat in such a way that the plural recesses become aligned with the plural projections. In the correct position, a screw can be inserted through a hole and be tightened in a threaded hole such that the bottom side of the milling insert is pressed against the bottom surface, while parts of a clearance surface come into abutment against side-support surfaces in the insert seat. The flanks of the projections come into abutment against the recesses only upon machining, if the milling insert moves somewhat. Although this solution does not suffer from the abutment becoming overdetermined, a certain displacement of the milling insert must be allowed in the insert seat such that the precise positioning of the cutting edges in relation to the basic body is lost.

SUMMARY OF THE INVENTION

The present invention obviates the above-mentioned drawbacks and provides an improved milling tool.

Thus, an object of the invention is to provide a milling insert for contour milling, which can be mounted in a stable and exact way, where the precision in respect of the position of the cutting edges in relation to the basic body is retained during machining.

In an embodiment, the invention provides an indexable milling insert including opposite top and bottom sides between which a clearance surface extends, and two opposite cutting edges are formed in the transition between the top side and the clearance surface. Each of the cutting edges includes a substantially straight portion in connection with a straight section of the clearance surface, and a curved portion in connection with a convexly arched section of the clearance surface. The milling inserts also include a coupling that has one or more male- and/or female-like engagement members.

In another embodiment, the invention provides a milling tool including a basic body that has an insert seat and a milling insert, which is detachably mounted in the insert seat by a tightening element. The milling insert and the insert seat each include couplers having cooperating male- and/or female-like engagement members for securing the milling insert in a mounted state.

In yet another embodiment, the invention provides a shim plate attachment for a milling tool.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 5 is a planar view from above of the same milling insert, FIG. 6 is a planar view from below of the milling insert, FIG. 7 is a side view of the milling insert, FIG. 8 is an opposite side view of the milling insert.

DETAILED DESCRIPTION OF THE PREFERRED EMBODIMENTS

Figure 1:
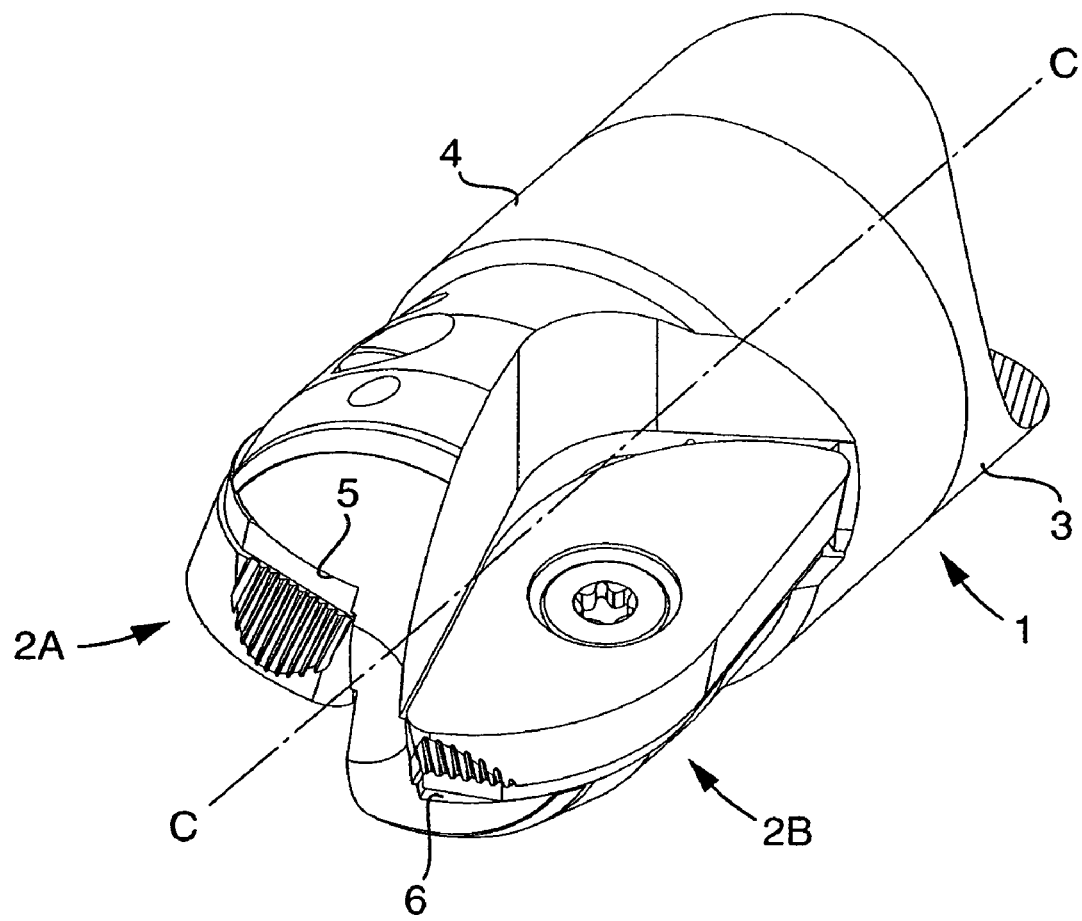
FIG. 1 is a perspective view showing a milling tool according to the present invention.
Figure 2:
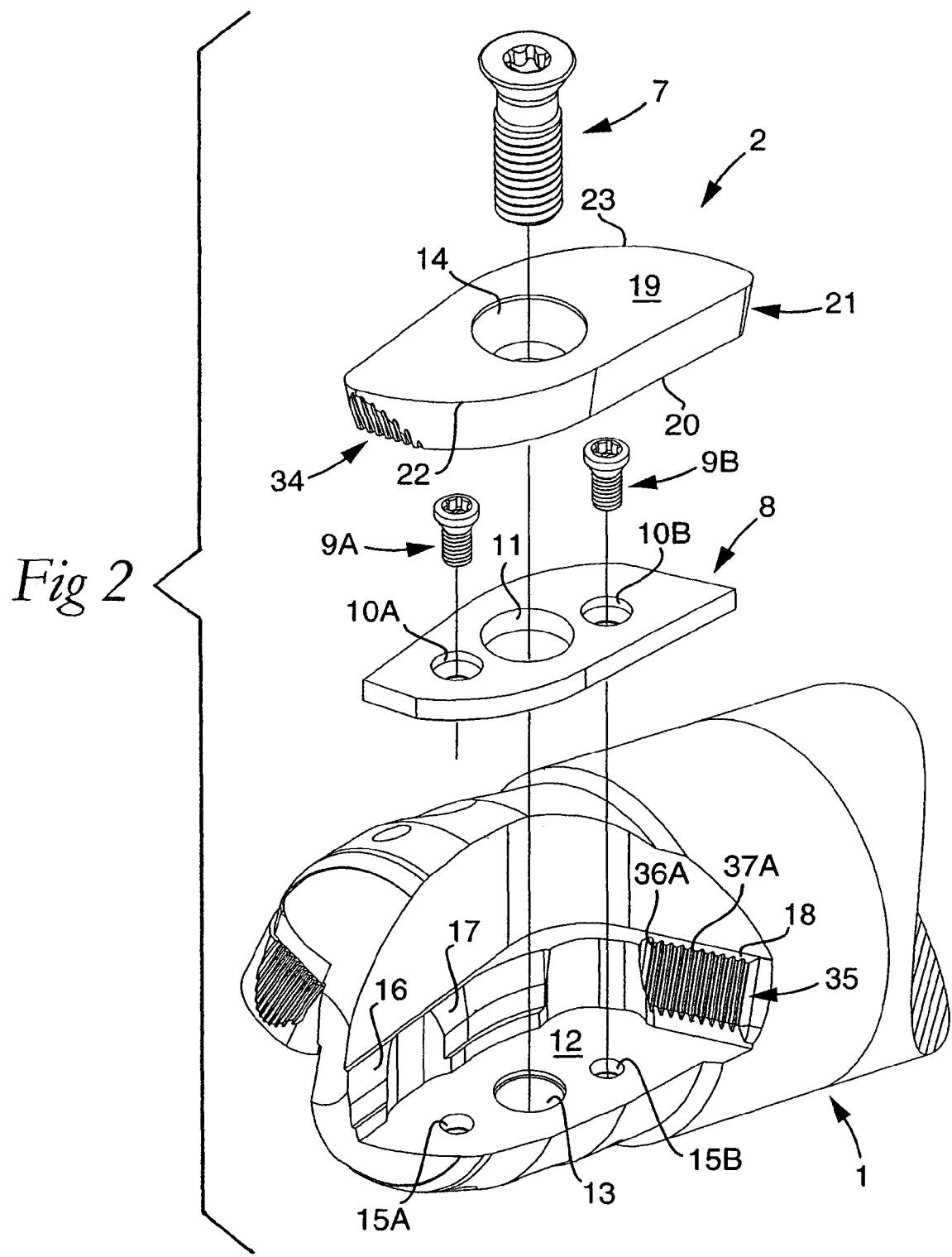
FIG. 2 is a perspective exploded view showing a milling tool according to FIG. 1, a milling insert being shown separated from an insert seat in the holder or basic body of the tool, as well as a shim plate between the basic body and the milling insert.

In FIGS. 1-9, a cutting tool is shown in the form of a contour mill, e.g., for machining metal, which in a conventional way includes a basic body 1, as well as a number of milling inserts 2. The basic body comprises a shaft 3, which can be fixed in a tool holder, and a front end 4. In the front end 4, two insert seats are formed, viz. an inner insert seat 5 and an outer insert seat 6, each of which individually carries a milling insert 2, preferably made from sintered cemented carbide. The "inner" and "outer" designation of the insert seats 5,6 is related to the radial position of the respective insert seat. A clamping member in form of a screw 7 is shown holding the milling insert 2 in the insert seat 6 (a similar arrangement for insert seat 6 is not visible in FIG. 1). The insert seats 5,6 and the respective milling inserts 2A,2B are placed in such a way that the inner milling insert 2A in the inner insert seat 5 extends into and preferably past an imaginary axis C-C, around which the basic body 1 is rotatable and which is located in the center of the basic body 2. Such placement means that the tool can drill into a workpiece. The outer milling insert 2B in the outer insert seat 6 is arranged somewhat beside the geometrical axis C-C. The active cutting edges of the milling inserts 2A,2B are arranged in such a way that, upon rotation, a perfect semi-sphere may be formed. Preferably, the milling inserts 2A,2B are identical. When the active edges of the milling inserts 2A,2B become worn out or blunt, previously inactive edges are indexed up to an active position and, at the same time, the milling inserts 2A,2B are exchanged between the insert seat 5,6.

Respective shim plates 8 are arranged between the respective milling insert 2A,2B and insert seats 5,6. A shim plate 8 is preferably secured in a respective insert seat by two screws 9A,9B, which cooperate with the holes 10A, 10B. The shim plate 8 also includes a center hole 11.

Each insert seat 5,6 includes a bottom surface 12 in which a threaded hole 13 is formed in order to receive the screw 7 extending through a through hole 14 in the milling insert 2, and in which two smaller threaded holes 15A,15B are formed in order to receive the screws 9A,9B. Furthermore, each the insert seat has a front side-support surface 16, an intermediate side-support surface 17, and a rear side-support surface 18; where the positional designations are related to the axial direction of the tool.

An individual milling insert 2 as shown in FIGS. 3-8 fits, as mentioned above, in each of the insert seats 5,6. The milling insert 2 has an eye-like or leaf-like basic shape, which is determined by generally planar opposite top and bottom sides 19,20, which are mutually parallel. Extending between the top and bottom sides 19,20 is a circumferential peripheral clearance surface 21. The concept of clearance surface 21 should, in this connection, be interpreted in the widest sense thereof. Thus, the clearance surface 21 may be formed as a continuous surface extending between the top and bottom sides 19,20 of the milling insert; or alternatively as a number of partial surfaces that jointly form a surface extending between the top and bottom sides 19,20 of the milling insert 2. In the transition between the top side 19 and the clearance surface 21, two opposite cutting edges 22,23 are formed. Each cutting edge 22,23 includes a substantially straight edge portion 24,25 corresponding with a straight section 26,27 of the clearance surface 21, and includes a curved edge portion 28,29 corresponding with a convex arched section 30,31 of the clearance surface 21. The curved edge portions 28,29 are of different length, which most clearly is seen in FIGS. 5 and 6. The straight portions 24,25 are not parallel but form an angle with each other, suitably between 4° and 20°, and preferably between 6° and 15°. At a first end, the straight edge portions 24,25 connect with a corner 32,33, and at a second end, with a curved edge portion 28,29. The curved edge portions 28,29 are both defined by a substantially identical radius of curvature. Each of the curved edge portions 28,29 represents at least 40% of the total length of the respective cutting edge 22,23. It should also be mentioned that the clearance surface 21 of the milling insert is oriented at an acute angle, e.g., within the range of 80-85° (not indicated), with respect to the top side 19.

According to preferred embodiments of the present invention, the milling insert 2 includes at least one first coupling 34, which is situated on the clearance surface 21 of the milling insert 2. The coupling 34 is intended to, in the mounted state of the milling insert 2, cooperate with a second coupling 35, which is formed in the rear side-support surface 18 of an insert seat 5,6. In order to guarantee that the couplings 34, 35 are pressed together in connection with mounting of the milling insert 2, the threaded hole 13 in the insert seat 6 and the hole 14 in the milling insert 2 are adapted in such a way, that tightening of the screw 7 gives a certain prestress. In the shown preferred embodiment, each of the couplings 34,35 has engagement members in the form of ridges 36 and grooves 37. The cross-section shape of the ridges 36 is conventional and therefore not especially illustrated in a separate figure. Generally, it may however be said that an individual ridge is delimited by two opposite flank surfaces or flanks, between which there is a crest, which forms the highest situated portion of a ridge 36. Preferably, a common angle between the flank surfaces is approximately 60°. However, other angles are also feasible. It is essential that the crests of the ridges 36 on one of the couplings do not contiguously engage a bottom of the grooves 37 on the other coupling. It is also essential that the spacing between adjacent ridges 36 is the same in both couplings 34,35 to ensure that the couplings 34,35 fit together.

In the choice of engagement members, ridges and grooves are preferable, because the forces to be carried principally act in a plane that is parallel to the bottom surface 12 of an insert seat 5,6. More precisely, it is preferable to prevent the milling insert 2 from sliding along the bottom surface 12. The forces are carried by a number of ridges 36 via the force-transferring flanks thereof, the total surface of which becomes relatively great compared with other types of members that are not as long, for instance knob-shaped members, which are suitable for carrying forces in a plurality of directions. Grooves and ridges are particularly advantageous with small insert dimensions, since other engagement members—for carrying the corresponding forces—have to be given a size which is too dominant and which thereby disadvantageously affects to a great extent the geometry and properties of the milling insert.

Figure 3:
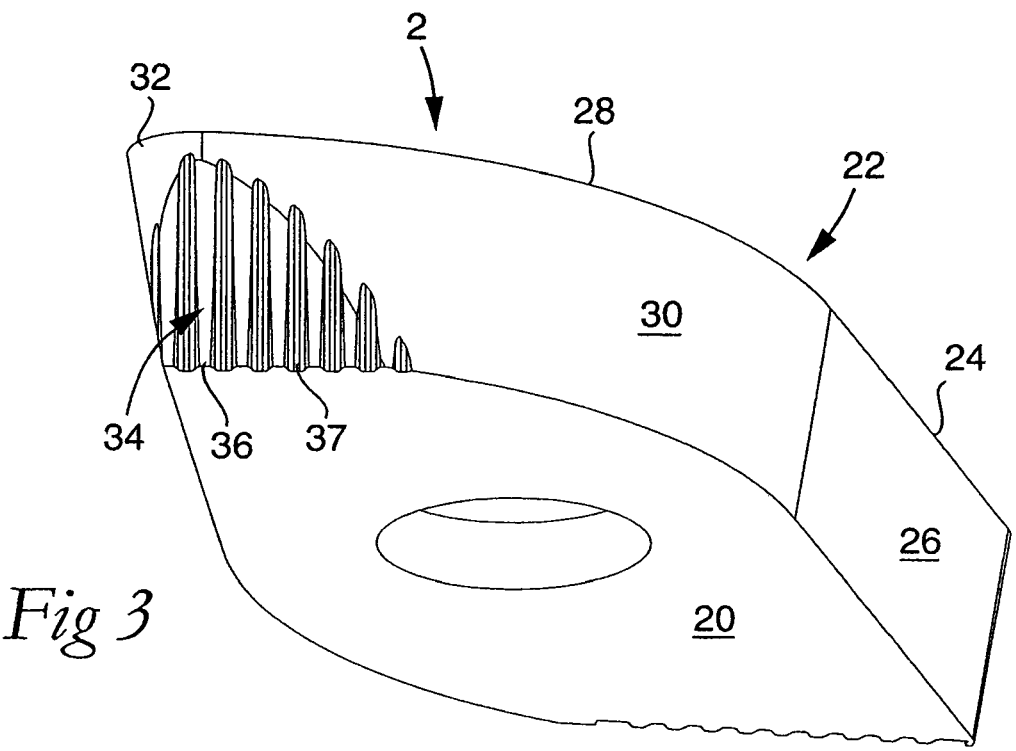
FIG. 3 is a perspective view obliquely from below of the milling insert according to FIG. 2.
Figure 4:
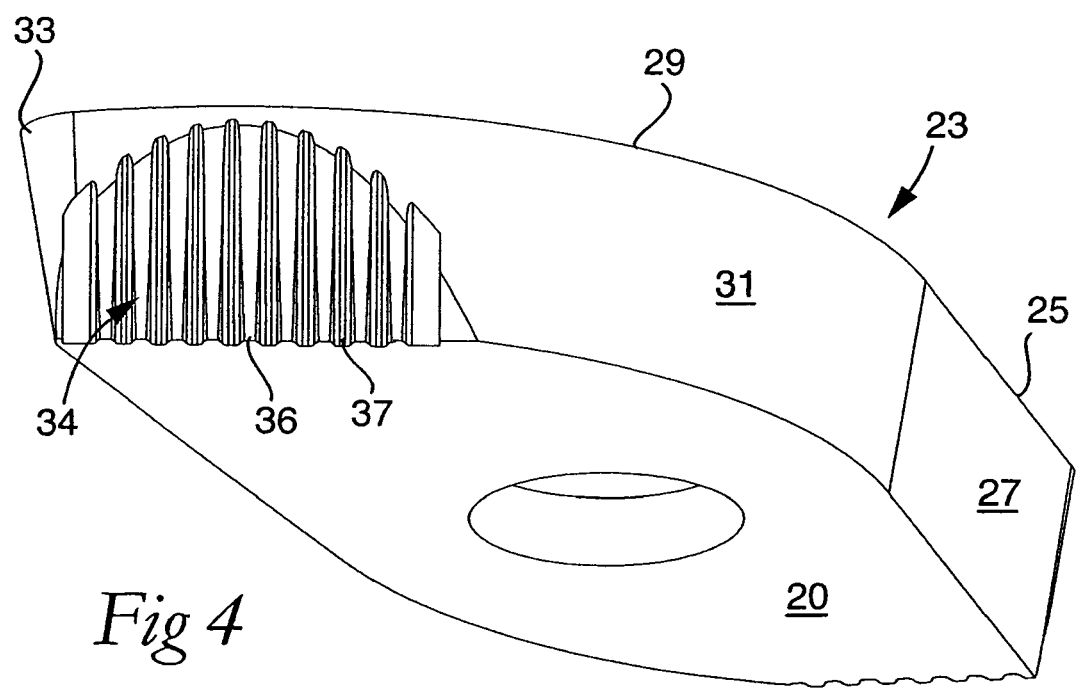
FIG. 4 is an analogous perspective view showing the milling insert rotated 180°, in relation to the position according to FIG. 3.

In FIGS. 3 and 4, seven ridges 36 are shown in the convex arched section 30 situated in connection with the corner 32, and that nine ridges 36 are shown in the convex arched section 31 situated in connection with the corner 33. Of course, the number of ridges 36 may vary, but it is preferred that there are at least three ridges 36 and at most twelve ridges 36. It is also seen that each one of the grooves 37 along the entire length thereof opens out from the clearance surface 21, and that the longitudinal axes of the ridges 36 and of the grooves 37, respectively, extend at an angle to the bottom side 20 of the milling insert. This angle may vary, but is preferably approximately 90°. Of course, the ridges 36A and the grooves 37A, respectively, in the insert seat are arranged correspondingly in relation to the bottom surface 12 of the insert seat, i.e., preferably they form an approximately right angle with the bottom surface 12. The number of ridges 36 and grooves 37 in one of the couplings, e.g., milling insert 2, does not necessarily need to correspond to the number of ridges 36A and grooves 37A in the other coupling, e.g., insert seat.

As has been mentioned above, the couplings 34 are situated along the convex arched sections 30,31 of the clearance surface 21, but it is also feasible to arrange the same along the straight sections 26,27. However, a position along the convex arched sections 30,31 is preferable, since these sections have a greater tendency to be displaced along the rear side-support surface 18 in a direction parallel to the bottom surface 12, especially at small cutting depths, such as has been described above. It is further preferred that the coupling 34 occupies only a limited part, preferably at most 15%, of the total peripheral length of the clearance surface 21, since the position of the milling insert 2 in the insert seat 5,6 otherwise tends to become overdetermined, which may result in instability.

In FIGS. 3 and 4, it is also seen that distal ends, i.e., with respect to the bottom side 20 of the milling insert 2, of the respective ridges 36 are spaced from the cutting edges 22,23. In this way, an unbroken, continuous cutting edge 22,23 is obtained, which in most cases is desirable. The length of the longest ridge 36 may of course vary, but should amount to at least 25% of the height of the milling insert 2, where the height is defined as the distance from the top side 19 to the bottom side 20. In roughing, it would also be feasible to use a milling insert 2 having a cutting edge 22,23 that is uneven or toothed, which would be the result if one or more of the respective ridges 36 extend all the way up to and ends in the top side 19 of the milling insert 2.

Figure 9:
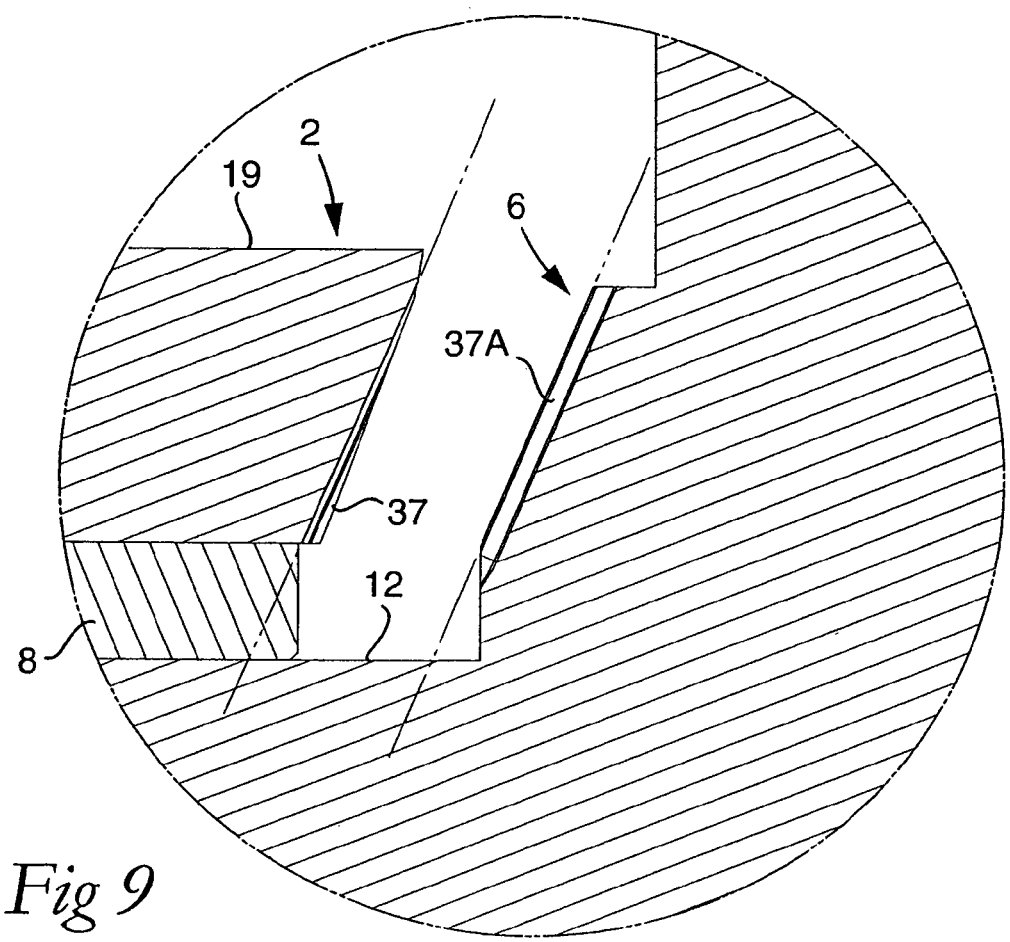
FIG. 9 is a schematic and very enlarged section of the milling insert and the insert seat before the coupling means have been brought together.

In FIG. 9, a schematic section of a milling insert 2 and an insert seat 6 is shown before the couplings have been brought together. Here, it is seen that the separation of the grooves 37 from the cutting edge 22,23 has been accomplished by the fact that the respective groove 37 has a depth that successively decreases in the direction toward the top side 19 of the milling insert 2. Consequently, also the ridges 36 have a height that successively decreases in the direction toward the top side 19 of the milling insert 2. The greatest height, i.e., with respect to the bottom side 20 of the milling insert 2, of the respective ridges 36 should amount to 0.1 millimeter and not be greater than 1 millimeter. The ridges 36 and the grooves 37, respectively, may be produced by means of a milling cutter adapted for the purpose.

Also the ridges 36A on the insert seat 6, more precisely in the rear side-support surface 18, may be produced by milling. However, in this case, the depth of the grooves 37A is constant. In this connection, it may also be observed that the crests of the ridges 36A of the insert seat 6 are parallel to the bottoms of the grooves 37A of the milling insert 2, as is seen from the two dash-dotted lines.

Figure 10:
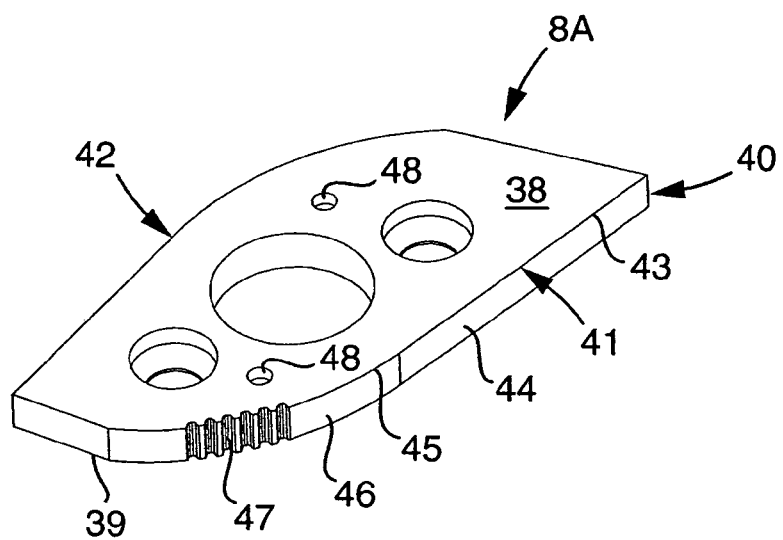
FIG. 10 is a perspective view of a shim plate according to the present invention.

In FIG. 10, a shim plate 8A according to a preferred embodiment of the present invention has a generally eye-like or leaf-like basic shape, which is determined by generally planar opposite top and bottom sides 38,39, which are mutually parallel. A circumferential peripheral surface 40 extends between the top and bottom sides 38,39. In the transition between the top side 38 and the peripheral surface 40, two opposite edges 41,42 are formed. Each of the edges 41,42 includes a substantially straight edge portion 43, in connection with a straight section 44 of the peripheral surface 40, and a curved edge portion 45, in connection with a convex arched section 46 of the peripheral surface 40. The shim plate 8A according to the invention includes a coupling 47, which is located along the peripheral surface 40. This coupling 47 cooperates with the corresponding coupling on a side-support surface of the insert seat 5,6. In order to stably fix the milling insert 2 on the top side 38, the shim plate 8A is provided with engagement members 48 (e.g., cylindrical recesses) intended to cooperate with engagement members on the bottom side of a milling insert (not shown). Thus, according to this embodiment, it is not necessary to have couplings on the clearance surface 21 of the milling insert 2. The coupling 47 has engagement members in the form of ridges and grooves, but it should however be pointed out that also other types of engagement members are feasible. In other respects, it also applies for the shim plate 8A that the number of ridges may vary, but that it is preferred that they amount to at least three and at most twelve; that the ridges and grooves, respectively, extend at a preferably right angle to the bottom side 39 of the shim plate; that the coupling 47 may be situated on the convex arched section 46 of the peripheral surface 40; and that the coupling 47 occupies only a limited part, preferably at most 15%, of the total length of the peripheral surface 40. Furthermore, the depth of the grooves in the coupling 47 is advantageously constant along the length of the grooves, and the grooves extend between the top and bottom side 38,39 of the shim plate 8A. Also the shim plate 8A may, as well as the milling insert 2, advantageously be indexable and thereby include a coupling on the part of the peripheral surface 40 (not shown).

While the invention has been disclosed with reference to certain preferred embodiments, numerous modifications, alterations, and changes to the described embodiments are possible without departing from the sphere and scope of the invention, as defined in the appended claims and their equivalents thereof. For example, the ridges and the grooves, respectively, of the milling insert may be produced by direct pressing. In this case, it is possible to form also the grooves and ridges, respectively, of the milling insert with constant depth, also in the case where the end of the grooves closest to the cutting edge is spaced from the cutting edge. In this case, the ridges and the grooves, respectively, in the end closest to the cutting edge may have an abrupt termination. And instead of a plurality of elongate ridges (and intermediate grooves), it is also feasible to use only a single male-like projection in one of the surfaces for the connection with a female-like seat in the other surface, wherein the projection and the seat may have an arbitrary shape, e.g., round, oval, quadrangular, etc. Accordingly, it is intended that the invention not be limited to the described embodiments, but that it have the full scope defined by the language of the following claims.

What is claimed is:

1. An indexable milling insert comprising:
    opposite top and bottom sides between which a clearance surface extends, the clearance surface extending along a length including two straight sections and two convex arched sections;
    two opposite cutting edges formed in a transition between the top side and the clearance surface, each of the cutting edges including:
        a substantially straight edge portion in connection with a respective one of the straight sections of the clearance surface; and
        a curved edge portion in connection with a respective one of the convex arched sections of the clearance surface; and a coupling located along the clearance surface and including one or more male- and/or female-like engagement members, wherein the engagement members comprise a plurality of ridges which are separated by grooves, and each individual groove comprises a depth that successively decreases in a direction towards the top side.

2. The milling insert according to claim 1, wherein the coupling occupies a limited part of the length of the clearance surface.

3. The milling insert according to claim 1, wherein the coupling is located along at least one of the convex arched sections of the clearance surface.

4. The milling insert according to claim 1, wherein the coupling comprises a distal end with respect to the bottom side of the milling insert, and the distal end is spaced from the cutting edges.

5. The milling insert according to claim 1, wherein the plurality of ridges comprise at least three ridges and at most twelve ridges.

6. The milling insert according to claim 1, wherein the each of the plurality of ridges and grooves extend at an angle with respect to the bottom side.

7. The milling insert according to claim 1, wherein each of the plurality of ridges comprises a greatest height of at least 0.1 millimeters.

8. The milling insert according to claim 1, wherein each of the plurality of ridges comprises a greatest height of at most one millimeter.

9. A milling tool comprising:
a body including an insert seat having a bottom surface and at least one side-support surface; and
a milling insert detachably mounted to the insert seat, the milling insert including:
opposite top and bottom sides between which a clearance surface extends, the clearance surface extending along a length including two straight sections and two convex arched sections;
two opposite cutting edges formed in a transition between the top side and the clearance surface, each of the cutting edges including:
a substantially straight edge portion in connection with a respective one of the straight sections of the clearance surface; and
a curved edge portion in connection with a respective one of the convex arched sections of the clearance surface; and
cooperative couplings securing the milling insert in a mounted state to the insert seat, a first one of the couplings being located along the clearance surface of the milling insert, a second one of the couplings being located along the side-support surface of the insert seat, and the couplings including one or more male- and/or female-like engagement members, wherein the engagement members comprise a plurality of ridges which are separated by grooves, and each individual groove comprises a depth that successively decreases in a direction towards the top side.

10. A milling insert comprising:
a first surface including a first peripheral edge;
a second surface including a second peripheral edge spaced from the first peripheral edge;
a clearance surface between the first and second peripheral edges, the clearance surface including first and second straight sections and first and second convex arched sections; and
a coupling disposed on the clearance surface and including one or more male- and/or female-like engagement members, wherein the engagement members comprise a plurality of ridges which are separated by grooves, and each individual groove comprises a depth that successively decreases in a direction towards the top side.

11. The milling insert according to claim 10, wherein the first peripheral edge comprises first and second cutting edges.

12. The milling insert according to claim 11, wherein the coupling is disposed on at least one of the first and second convex arched sections.

13. The milling insert according to claim 12, wherein the coupling comprises first and second coupling portions, the first coupling portion being disposed on the first convex arched section, and the second coupling portion being disposed on the second convex arched section.

14. The milling insert according to claim 13, wherein the first coupling portion comprises a first set of alternating parallel ridges and grooves, the second coupling portion comprises a second set of alternating parallel ridges and grooves, and each of the first and second sets of alternating parallel ridges and grooves extend partially across the clearance surface from the second peripheral edge toward the first peripheral edge.

15. The milling insert according to claim 14, wherein the second surface comprises a planar surface, and the first and second sets of alternating parallel ridges and grooves extend at an angle to the planar surface.

16. The milling insert according to claim 14, wherein the second peripheral edge comprises a partially serrated edge defined by the first and second sets of alternating parallel ridges and grooves, and the first peripheral edge comprises a non-serrated edge.

* * * * *